(12) United States Patent
Waggoner et al.

(10) Patent No.: US 10,553,029 B1
(45) Date of Patent: Feb. 4, 2020

(54) USING REFERENCE-ONLY DECODING OF NON-VIEWED SECTIONS OF A PROJECTED VIDEO

(71) Applicant: Amazon Technologies, Inc., Seattle, WA (US)

(72) Inventors: Charles Benjamin Franklin Waggoner, Portland, OR (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 8 days.

(21) Appl. No.: 15/392,652

(22) Filed: Dec. 28, 2016

Related U.S. Application Data

(63) Continuation-in-part of application No. 15/282,771, filed on Sep. 30, 2016, now Pat. No. 10,412,412.

(51) Int. Cl.
*G06T 19/00* (2011.01)
*H04N 13/161* (2018.01)
*H04N 13/383* (2018.01)

(52) U.S. Cl.
CPC ......... *G06T 19/006* (2013.01); *H04N 13/161* (2018.05); *H04N 13/383* (2018.05)

(58) Field of Classification Search
CPC .............................. G06T 19/003; G06T 19/006
See application file for complete search history.

(56) References Cited

U.S. PATENT DOCUMENTS

| | | | |
|---|---|---|---|
| 5,652,616 A | 7/1997 | Chen et al. | |
| 5,734,419 A | 3/1998 | Botsford, III et al. | |
| 6,072,831 A | 6/2000 | Chen | |
| 6,111,596 A | 8/2000 | Haskell et al. | |
| 8,734,419 B2 | 5/2014 | Ormsby | |
| 9,078,008 B2 | 7/2015 | Ye et al. | |
| 9,769,450 B2 | 9/2017 | Xu et al. | |
| 9,774,887 B1* | 9/2017 | Walkingshaw | H04N 19/86 |
| 10,225,546 B2 | 3/2019 | Gupte et al. | |
| 10,412,412 B1 | 9/2019 | Waggoner et al. | |
| 2005/0018911 A1* | 1/2005 | Deever | H04N 13/0048 382/232 |
| 2006/0013490 A1 | 1/2006 | Sun | |
| 2007/0183495 A1* | 8/2007 | Kim | H04N 19/597 375/240.1 |
| 2008/0008241 A1 | 1/2008 | Park | |
| 2008/0240590 A1 | 10/2008 | Moon et al. | |
| 2009/0257452 A1 | 10/2009 | Lee et al. | |
| 2010/0309286 A1 | 12/2010 | Chen et al. | |
| 2011/0096832 A1 | 4/2011 | Zhang et al. | |

(Continued)

OTHER PUBLICATIONS

Ng, King-To, Shing-Chow Chan, and Heung-Yeung Shum. "Data compression and transmission aspects of panoramic videos." IEEE Transactions on Circuits and Systems for Video Technology 15.1 (2005): 82-95.*

(Continued)

*Primary Examiner* — Ryan McCulley

(74) *Attorney, Agent, or Firm* — Weaver Austin Villeneuve & Sampson LLP

(57) ABSTRACT

Techniques are described that enable virtual reality content to be delivered. These techniques include encoding frames of stereoscopic virtual reality content and decoding reference frames of the stereoscopic virtual reality content for non-viewed sections of the virtual reality content.

21 Claims, 8 Drawing Sheets

(56) References Cited

U.S. PATENT DOCUMENTS

| | | | |
|---|---|---|---|
| 2011/0134214 | A1 | 6/2011 | Chen et al. |
| 2011/0317760 | A1* | 12/2011 | Chen ................... G11B 27/007 375/240.12 |
| 2012/0027079 | A1 | 2/2012 | Ye et al. |
| 2012/0042090 | A1 | 2/2012 | Chen et al. |
| 2012/0057002 | A1* | 3/2012 | Grafulla-Gonzalez ..................... H04N 13/0044 348/51 |
| 2013/0182073 | A1 | 7/2013 | Yin et al. |
| 2013/0215115 | A1* | 8/2013 | Jenkins ................... G06T 15/20 345/420 |
| 2013/0287123 | A1 | 10/2013 | Rusert et al. |
| 2013/0342641 | A1 | 12/2013 | Morioka et al. |
| 2014/0064365 | A1 | 3/2014 | Wang et al. |
| 2014/0301459 | A1 | 10/2014 | Boyce et al. |
| 2014/0328389 | A1 | 11/2014 | Fu et al. |
| 2015/0124877 | A1 | 5/2015 | Choi et al. |
| 2015/0304681 | A1 | 10/2015 | An et al. |
| 2015/0312545 | A1 | 10/2015 | Xu et al. |
| 2016/0011923 | A1 | 1/2016 | Walker et al. |
| 2016/0012855 | A1* | 1/2016 | Krishnan ............. G11B 27/105 386/241 |
| 2016/0358383 | A1* | 12/2016 | Gauglitz ............... G06T 19/006 |
| 2017/0076674 | A1* | 3/2017 | Shintani ............... G09G 3/3406 |
| 2017/0155885 | A1* | 6/2017 | Selstad ............. H04N 13/0059 |
| 2017/0223300 | A1* | 8/2017 | Jang .......................... H04N 5/44 |
| 2017/0223368 | A1* | 8/2017 | Abbas ................... H04N 19/186 |
| 2017/0316753 | A1* | 11/2017 | Dunn ..................... G09G 5/005 |
| 2017/0347084 | A1* | 11/2017 | Boyce ................ H04N 13/0014 |
| 2018/0041764 | A1* | 2/2018 | Lin ...................... H04N 19/174 |

OTHER PUBLICATIONS

Kimata, Hideaki, et al. "Panorama video coding for user-driven interactive video application." Consumer Electronics, 2009. ISCE'09. IEEE 13th International Symposium on. IEEE, 2009.*

Heymann, S., et al. "Representation, coding and interactive rendering of high-resolution panoramic images and video using MPEG-4." Proc. Panoramic Photogrammetry Workshop (PPW). 2005.*

Sullivan, Gary J., et al. "Standardized extensions of high efficiency video coding (HEVC)." IEEE Journal of selected topics in Signal Processing 7.6 (2013): 1001-1016.*

Xiu, Xiaoyu, Gene Cheung, and Jie Liang. "Delay-cognizant interactive streaming of multiview video with free viewpoint synthesis." IEEE Transactions on Multimedia 14.4 (2012): 1109-1126.*

Mary-Luc Champel, "The Special Challenges of Offering High Quality Experience for VR video," Power point Presentation, 2016 Annual Technical Conference & Exhibition, 15 pages.

Champel, et al., "The Special Challenges of Offering High Quality Experience for VR video," Written Presentation, 2016 Annual Technical Conference & Exhibition, 10 pages.

Pierre Routhier, "Virtually Perfect: Factors affecting the quality of a VR experience and the need for a VR content quality standard," Written Presentation, 2016 Annual Technical Conference & Exhibition, 20 pages.

U.S. Appl. No. 15/282,771, filed Sep. 30, 2016, Waggoner et al.

U.S. Appl. No. 15/413,112, filed Jan. 23, 2017, Waggoner et al.

U.S. Office Action dated May 9, 2018 issued in U.S. Appl. No. 15/413,112.

U.S. Office Action dated Oct. 4, 2018 issued in U.S. Appl. No. 15/282,771.

U.S. Final Office Action dated Nov. 8, 2018 issued in U.S. Appl. No. 15/413,112.

U.S. Office Action dated Mar. 14, 2019 issued in U.S. Appl. No. 15/413,112.

U.S. Notice of Allowance dated May 7, 2019 issued in U.S. Appl. No. 15/282,771.

U.S. Final Office Action dated Jul. 11, 2019 issued in U.S. Appl. No. 15/413,112.

* cited by examiner

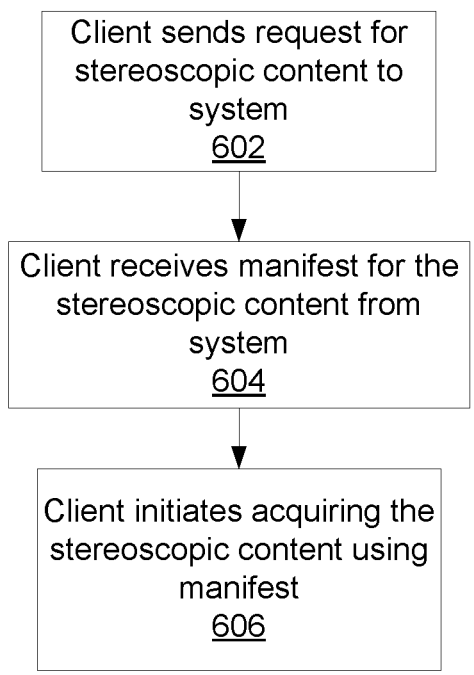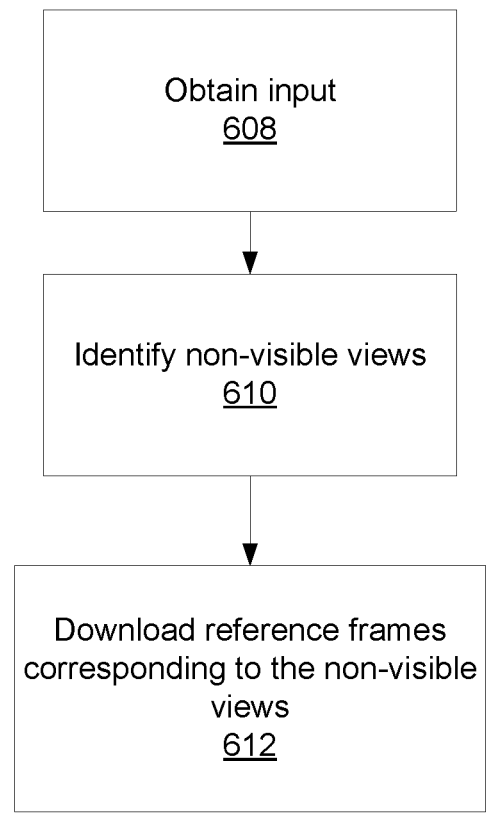
FIG. 6A
FIG. 6B

USING REFERENCE-ONLY DECODING OF NON-VIEWED SECTIONS OF A PROJECTED VIDEO

RELATED APPLICATIONS

This application claims priority under 35 U.S.C 120 to, and is a Continuation-In-Part (CIP) of, U.S. application Ser. No. 15/282,771, entitled "Using Reference-Only Decoding of Non-Viewed Sections of a Projected Video," by Waggoner et al, filed on Sep. 30, 2016, which is incorporated herein in its entirety and for all purposes.

BACKGROUND

Virtual reality is a computer technology that replicates an environment, real or imagined, and simulates a user's physical presence in the environment and, in some cases, enables the user to interact with the environment. Typically, virtual reality content is displayed on a computer monitor or with a virtual reality device such as a virtual reality headset, which is also commonly referred to as a head-mounted display. The user may interact with the environment by interacting with the virtual reality device, through the use of a standard input device such as a keyboard or mouse, or through a multimodal device such as a wired glove. As the user interacts with the environment, three-dimensional (3D) images are provided by virtual reality software that accesses virtual reality content.

A number of streaming media services enable multimedia such as movies and television programs to be streamed to client devices. However, since much more visual information needs to be available to simulate a user's presence in a 3D environment, streaming virtual reality content is particularly challenging.

BRIEF DESCRIPTION OF THE DRAWINGS

FIGS. 6A-6B are flowcharts illustrating methods of downloading stereoscopic content such as stereoscopic virtual reality content according to various implementations.

DETAILED DESCRIPTION

Figure 1:
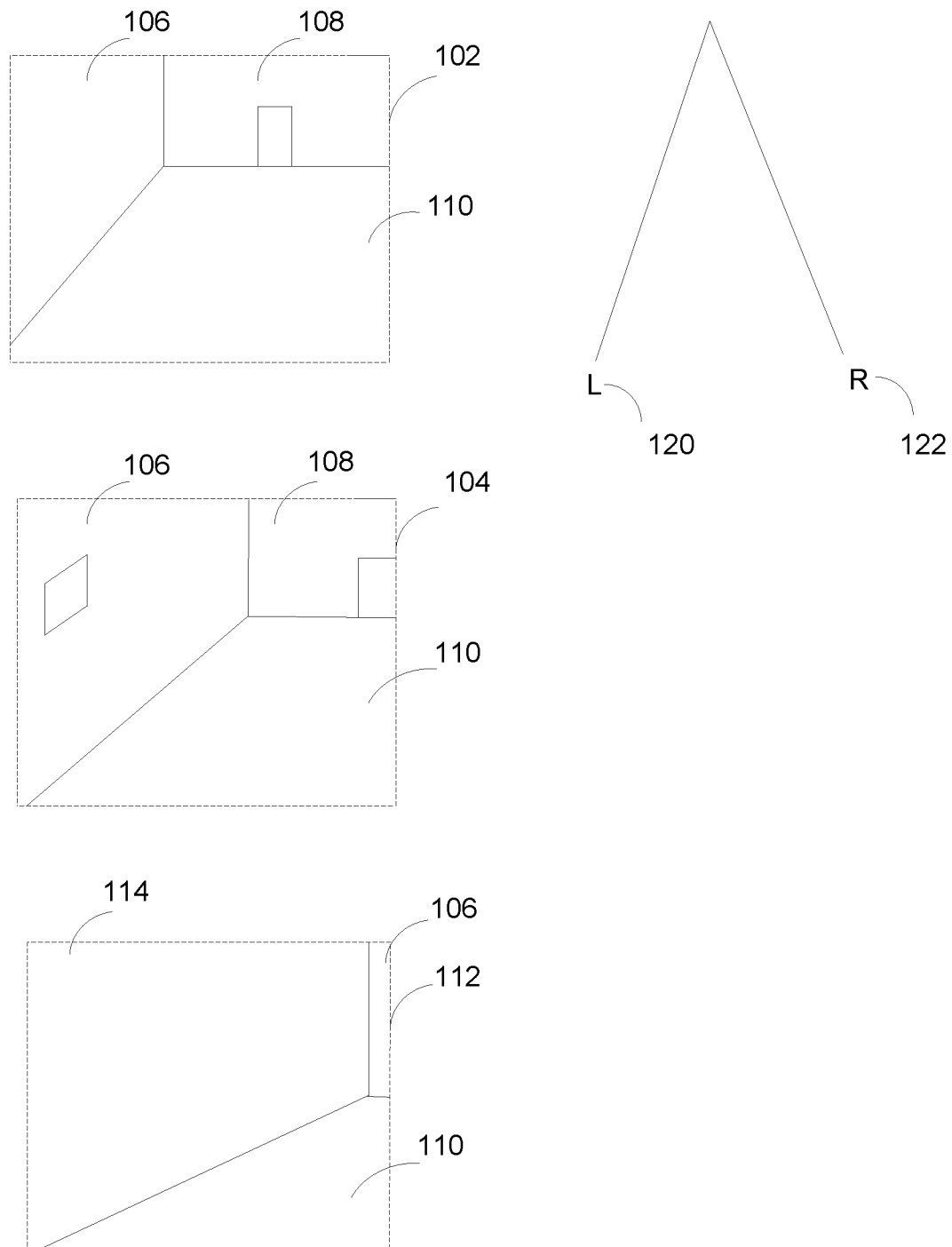
FIG. 1 illustrates an example of an application of a particular implementation.

This disclosure describes techniques that enable three-dimensional (3D) stereoscopic content to be encoded and decoded using views of a virtual reality environment that correspond to different positions or perspectives within the virtual reality environment.

In accordance with various implementations, a virtual reality environment may be rendered by selectively decoding frames associated with portions (e.g., views) of the virtual reality environment not currently in view. Each view may correspond to a left eye perspective or right eye perspective. In accordance with some implementations, virtual reality content is decoded such that reference frames for non-visible (e.g., non-viewed portions) of the virtual reality environment are decoded without decoding non-reference frames for the non-visible portions of the virtual reality environment. When a non-visible portion of the virtual reality environment subsequently comes into view, the non-reference frames may be decoded. By decoding reference frames associated with portions of the virtual reality environment before they become visible to the user, the virtual reality environment may be simulated at a client device with fewer disruptions to the rendering of the virtual reality content as the user changes position within the virtual reality environment.

In some implementations, the virtual reality content is stereoscopic. In other implementations, stereoscopic content is encoded and decoded outside a virtual reality context.

In accordance with various implementations, stereoscopic content is encoded using a temporal enhancement layer. Left eye frames may be interleaved with right eye frames within a base layer and temporal enhancement layer. Reference frames for a given eye view may be selected from frames of either eye view, enabling both inter-view and intra-view redundancy to be exploited. Left eye and complementary right eye images may be simultaneously rendered via a stereoscopic display.

Telecommunications networks and other content services commonly stream video to client devices for display on televisions and computer monitors. With the increase in availability of 3D virtual reality content, some content services offer the streaming of 3D virtual reality content. Since the virtual reality content offers a user the ability to view their virtual environment from a number of viewer-selected perspectives, the amount of data that is typically streamed to offer this capability can be significant.

To generate a 3D virtual reality environment, for a given user position or perspective within the virtual reality environment, there will often be two or more possible views, which can be rendered separately or simultaneously. More particularly, an image may be generated for each view that would be visible from the perspective of the user within the virtual reality environment at a given point in time. Therefore, a virtual reality environment is typically rendered using two or more independent video streams.

One technique for rendering 3D video content presents two different views separately to the left and right eye of the viewer. By presenting the two different views simultaneously, this gives the viewer the perception of 3D depth.

Multiview video coding (MVC) extension of H.264/MPEG-4 AVC (ISO/IEC MVC 2008) is a stereoscopic encoding standard that can be used to exploit the inter-view correlations between adjacent views in addition to the temporal correlation among frames of each individual view. To encode left eye and right eye views, MVC enables a first view corresponding to one eye to be represented in a base layer, while a delta between the first view and a second view corresponding to the other eye may be represented in an enhancement layer. In other words, MVC encodes right eye and left eye views separately in different layers of the encoded video stream.

Some video encoding standards enable the frame rate to be increased by transmitting additional video content via what is commonly referred to as "temporal interleaving." For example, High Efficiency Video Coding (HEVC), also known as H.265, supports temporal interleaving through the encoding of additional frames in a temporal enhancement layer. However, H.265 cannot exploit the inter-view correlations between two adjacent views. As a result, H.265 cannot exploit the similarities between left eye and right eye views of stereoscopic 3D video.

A number of frame packing formats have been developed that allow stereoscopic video to be transmitted. Frame packing includes packing pixels for both left-eye and right-eye views in a single frame of a compressed stream, which typically involves doubling the bit rate or reducing the resolution with which the left and right eye frames are encoded. Temporal packing is performed by alternating frames corresponding to the two different views, while exploiting redundancies within the same view.

According to various implementations, temporal interleaving can be used to exploit the redundancies between left eye and right eye views, as well as redundancies among frames within the same view. By using temporal interleaving to encode stereoscopic video, both left eye and right eye views can be transmitted in an encoded bit stream with a minimal increase in bit rate. Therefore, stereoscopic content may be encoded by leveraging a temporal enhancement layer of a video encoding standard that is not otherwise designed to encode multiple views of video content corresponding to the same time sample.

In some implementations, stereoscopic video content is decoded and rendered within a virtual reality environment. Generally, when a user interacts with a virtual reality environment, the user's change in position and/or perspective is detected by the client device and frames of the virtual reality content that reflect the user's changed perspective are then downloaded and decoded by the client device. These frames typically correspond to the video streams used to simulate the virtual reality environment at the user's new position. Since the number of frames that are downloaded to the client device and decoded can be substantial and the frames are downloaded and decoded after the user's changed position is detected, the available bandwidth and processing resources may be insufficient to generate and display images at the speed with which the user's position within their virtual environment changes.

In accordance with various implementations, to minimize the disruptions to the viewer's experience, selected frames may be decoded before the corresponding view is visible to the viewer. One example of such an implementation will be described in further detail below with reference to FIG. 1.

FIG. 1 illustrates an example of an application of a particular implementation. In this example, virtual reality software installed on a virtual reality device enables a user to walk through a virtual room. For each portion (e.g., view) of virtual reality content that is not currently in view from the user's current position within the virtual reality environment, reference frames may be decoded without decoding non-reference frames. As a portion of the virtual reality content comes into view, non-reference frames may be decoded. Therefore, images may be presented rapidly as the user walks through the virtual room.

In some implementations, two different views are independently presented to the left and right eye of the user, as shown at 120 and 122. By simultaneously presenting the two different views, the user may perceive 3D depth of a virtual reality environment.

As shown at 102, as the user looks through the virtual reality device, the user perceives himself to be in a room that includes a door. As depicted in FIG. 1, the portions of a virtual room that are visible to the user include wall 106, wall 108, and floor 110.

In some implementations, six different views of the virtual room correspond to six different faces of a virtual cube. In other implementations, two different offset views of the virtual room correspond to left eye and right eye views that together present a 3D image of the virtual room.

A decoder decodes reference frames for each view of the virtual room that is not currently in view from the position/perspective of the user. In this example, the ceiling, right wall, and back wall of the room are not visible from the position/perspective of the user. The decoder may independently decode reference frames for left eye and right eye views that are non-visible.

As the user rotates left while holding or wearing the virtual reality device, the user's perspective within the virtual room changes, as shown at 104. More particularly, a painting on wall 106 becomes visible, while the door on wall 108 moves out of view. The virtual reality device detects the user's change in position/perspective. The virtual reality software may then decode non-reference frames that reflect the user's change in perspective. More particularly, the decoder may decode non-reference frames for each view as it becomes visible to the user. For example, the decoder may decode non-reference frames for a left eye view and/or a right eye view. Since reference frames have already been decoded, the virtual reality device may quickly render an image that reflects the user's change in position/perspective using the relevant reference and non-reference frames.

The user continues to rotate left, as shown at 112. The back wall 114 of the room may come into view of the user's left eye, followed by the user's right eye. Since the reference frames corresponding to the left eye and right eye views were previously decoded while the back wall 114 was not in view, only the corresponding non-reference frames are decoded. More particularly, as the user rotates, the decoder may independently decode the non-reference frames corresponding to the left eye view, and subsequently decode the non-reference frames corresponding to the right eye view. In instances where the left eye view and the right eye view are substantially identical, non-reference frames corresponding to the right eye view need not be decoded. Moreover, in the event the user rotates quickly, the decoder may elect not to decode the non-reference frames corresponding to the right eye view. Therefore, the visible portions of the virtual reality content can be rendered as they come into view without delays or disruptions.

In some instances, the user may change his or her location within the virtual reality environment by "node jumping." This may occur, for example, where the user presses a button on a virtual reality device or moves his or her head while wearing a virtual reality headset. To simulate the user's presence at this new location within the virtual reality environment, frames including reference frames and non-reference frames for left eye and right eye views may be decoded.

The example described above pertains to decoding of virtual reality content. In accordance with various implementations, virtual reality content may also be selectively downloaded. More particularly, reference frames corresponding to non-visible views may be downloaded (e.g., while the views are non-visible). Therefore, images may be rendered rapidly while minimizing the amount of data that is downloaded and stored at the virtual reality device.

Figure 2:
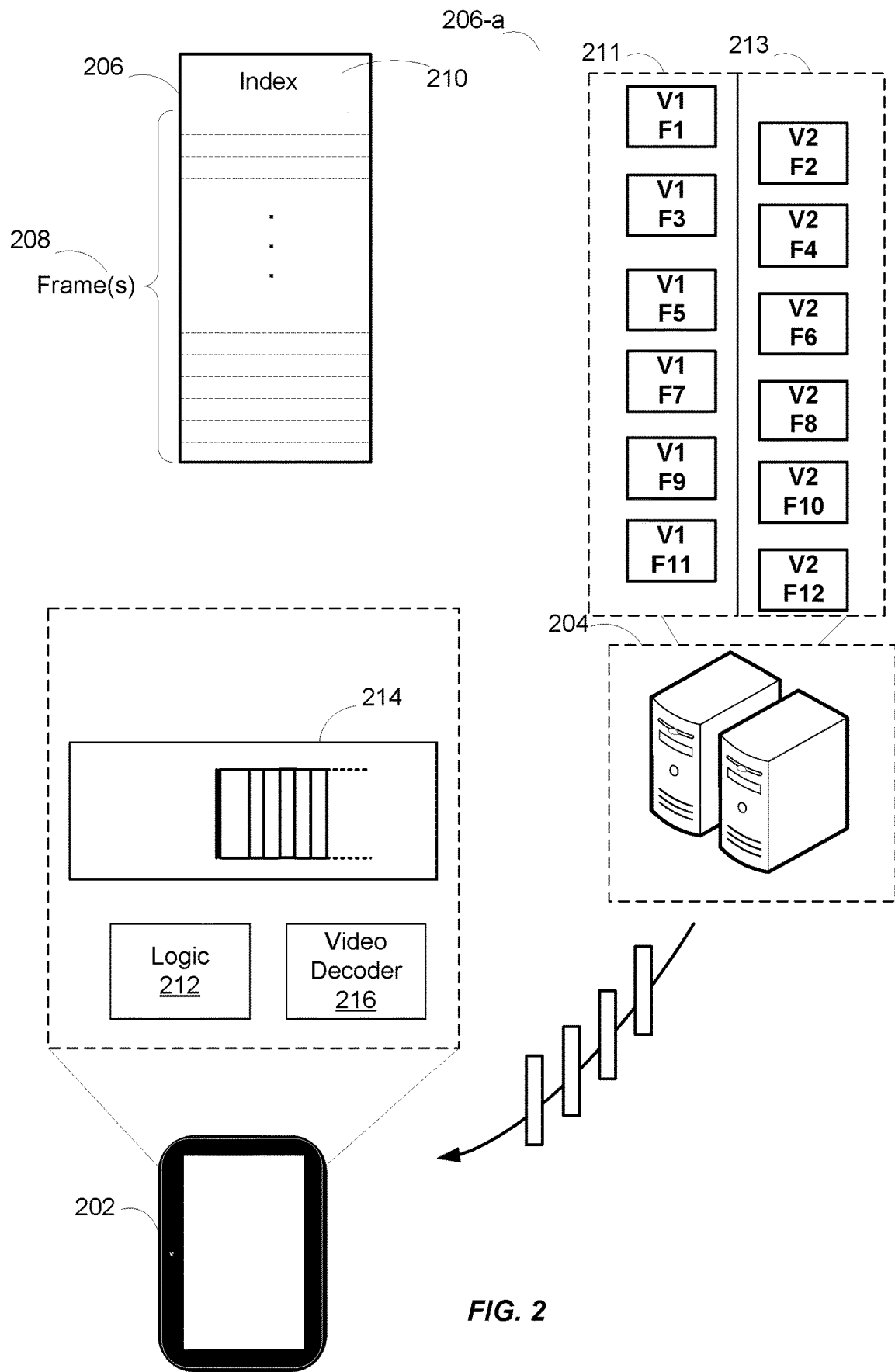
FIG. 2 illustrates the operation of an example of a particular implementation.

FIG. 2 illustrates the operation of an example of a particular implementation. A user of client device 202 browses a catalogue of stereoscopic titles available from service 204. When the user selects one of the titles, content service 204 streams content corresponding to the selected title to client device 202. The streaming of content to client device 202 is facilitated by software installed on client device 202. For example, the software may include virtual reality software that facilitates the rendering of stereoscopic virtual reality content. The software operates to provide 3D stereoscopic content via a display that is integrated with client device 202 (as shown) or coupled to client device 202, as will be described in further detail below.

Service 204 maintains files associated with the titles available from service 204 that enable stereoscopic content to be streamed to client devices using service 204. In this example, service 204 selects file(s) 206 that are relevant to the selected title. File 206 is a video file that includes frames 208 that have been encoded by a video encoder that operates according to a video encoding standard such as H.265. In another implementation, stereoscopic content may be generated and encoded dynamically.

As shown in FIG. 2, each file 206 can include one or more media fragments. Each media fragment includes a fragment index 210 and frame(s) 208. In this example, file 206-*a* corresponding to the selected virtual reality title can include two or more sets of frames, where each set of frames corresponds to a different view. Each view corresponds to a left eye perspective or a right eye perspective. Each set of frames is a sequence of frames that includes one or more reference frames and one or more non-reference frames. A reference frame is a frame of a compressed video that is used to define other frames, while a non-reference frame is a frame that is not used to define other frames. In some implementations, each view corresponds to a position or perspective from a corresponding position or perspective in a virtual environment.

Each fragment of encoded virtual reality content typically includes several frame types, with the frame type defining the kind of dependency allowed for that frame. Dependencies between frames may be used to support data compression by eliminating inter-view and intra-view redundancies.

An I-frame, or intra frame, is a self-contained frame that can be independently decoded without reference to other preceding or future frames. An I-frame may be the first frame in a video sequence or may act as a starting point to reset the decoder. Therefore, each I-frame can be identified as a reference frame.

A P-frame, which stands for predictive inter frame, references earlier I- or P-frames to encode an image. A B-frame, which stands for bi-predictive inter frame, is a frame that references both an earlier reference frame and a future frame. A P-frame may only reference preceding I- or P-frames, while a B-frame may reference both preceding and succeeding I- or P-frames. Encoding standards such as H.264 provide further encoding options that enable a B-frame to be referenced by a P-frame or a B-frame. Therefore, it is possible for a P-frame or B-frame to be a reference frame or non-reference frame.

In this example, two different views that independently correspond to left eye and right eye perspectives are shown. The views are represented as V1 and V2, where a given view may represent either a left eye or right eye perspective. For example, V1 and V2 may correspond to left eye and right eye perspectives, respectively, or vice versa.

Each view corresponds to a sequence of frames. The frames within a given sequence of frames correspond to subsequent instants of time, which are generally represented by timestamps. The frame sequences for left eye and complementary right eye views may be correlated in time. For example, the first frames in both sequences of frames may correspond to a first instant of time, the second frames in both sequences of frames may correspond to a second instant of time, etc.

In this example, base layer 211 corresponds to frames of the first view V1, which are denoted by odd numbers. Similarly, temporal enhancement layer 213 corresponds to frames of the second view V2, which are denoted by even numbers. Each of the frames in the base layer corresponds to different respective time instants T1-T6; frames in the enhancement layer are correlated in time with the frames of the base layer and correspond to the same time instants T1-T6, respectively. In other words, the first frame in base layer 211 corresponds to the same instant of time as the first frame in enhancement layer 213. This may be ascertained from the timestamps within metadata of the respective frames.

As shown in FIG. 2, the first frame in base layer 211, F1, includes a base layer frame for the first view, V1; the first frame in enhancement layer 213, F2, includes an enhancement layer frame for the second view, V2. For example, frame F1 may represent a base layer frame for the left eye, while frame F2 may represent an enhancement layer frame for the right eye that indicates a delta between the right eye and the left eye.

Right eye frames and left eye view frames may be alternately encoded within base layer 211 and enhancement layer 213, as will be described in further detail below. Thus, in this example, the second frame in base layer 211 includes a base layer frame for the first view, while the second frame in the enhancement layer 213 includes an enhancement layer frame for the second view. An enhancement layer frame may represent the delta between the image to be presented and a reference frame of either view, where the reference frame corresponds to the same instant of time or a different (e.g., prior or subsequent) instant of time. For example, the enhancement layer frame may represent the delta between the image to be presented and a reference frame selected from 1) a base layer frame corresponding to the complementary view for the same time instant or 2) frames for the same view, where each of the frames for the same view corresponds to a previous or subsequent time instant.

As shown in this example, within a given base or enhancement layer, frames of the left eye view may be odd-numbered and the frames of the corresponding right eye view may be even-numbered, or vice versa. In addition, the frames for a first eye view may include a sequence of frames beginning with a reference frame (e.g., a frame that can be decoded independently), while the frames for a second eye view may include a sequence of frames beginning with a non-reference frame (e.g., a frame that represents a difference from at least one other frame).

In one implementation, the stereoscopic content is encoded according to H.265. Rather than using a temporal enhancement layer to increase the frame rate of the video that is transmitted, the temporal enhancement layer is used to facilitate the reduction of intra- and inter-view redundancies. Therefore, client devices that do not support MVC may decode stereoscopic content that is encoded according to another video encoding standard such as H.265.

In one implementation, content service 204 provides information pertaining to the fragments of the stereoscopic content to client device 202. For example, content service 104 may provide a manifest file that indicates locations (e.g., URLs and/or byte offsets) at which the fragments or portions thereof can be accessed. Client device 202 can use the manifest to download fragments or portions thereof. For example, client device 202 can download a fragment header including a fragment index that can be used to download frames, as will be described in further detail below.

Logic 212 of client device 202 may download video fragment(s) from content service 204 and store the fragment(s) in memory 214 (or buffer). Alternatively, logic 212 may selectively download frames of the video fragments from content service 204 and store the frames in memory 214. In one implementation, reference frames for views that are not visible from the current position/perspective within a virtual reality environment may be downloaded (e.g., while the views are not visible) without downloading non-reference frames for the views. When a non-visible view subsequently becomes visible or is likely to become visible from another position/perspective within the virtual reality environment, corresponding non-reference frames may be downloaded.

As logic 212 selects reference frames and/or non-reference frames for decoding, logic 212 provides the selected frames to a video decoder 216. In some implementations, logic 212 selects reference frames for views that are not currently visible from the current position/perspective within a virtual reality environment. For those views that are visible or likely to become visible, logic 212 may select non-reference frames. If reference frames associated with a currently visible view have not already been decoded, logic may also decode reference frames for the view. In one implementation, non-reference frames associated with only visible views are decoded. In this manner, video decoder 216 decodes the frames to generate the corresponding digital images representing the various views of the virtual reality environment.

Logic 212 may download and/or decode frames of stereoscopic virtual reality content according to a predictive model. In one implementation, logic 212 applies a predictive model to predict views most likely to be selected or viewed next (e.g., within a period of time) by the user.

Figure 3:
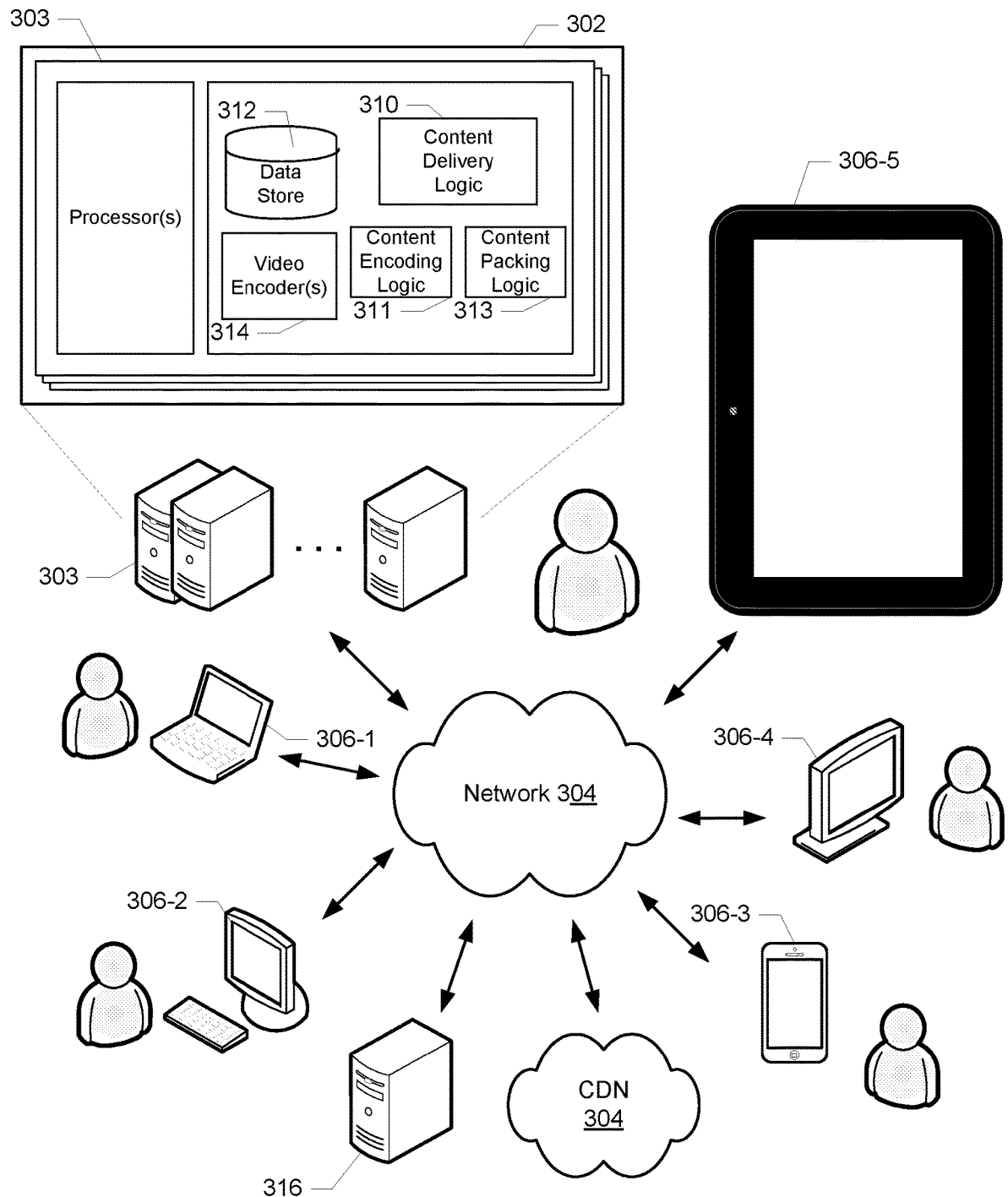
FIG. 3 is a simplified diagram of a computing environment in which various implementations may be practiced.

FIG. 3 illustrates an example of a computing environment in which a service 302 such as a content service provides stereoscopic content via network 304 to a variety of client devices (306-1 through 306-5) in accordance with the techniques described herein. More particularly, the content may include stereoscopic video-on-demand (VOD) content or broadcast content (e.g., 3D video of live events).

Content service 302 includes content delivery logic 310 which facilitates various aspects of content delivery to client devices 306. Content service 302 may conform to any of a wide variety of architectures such as, for example, a services platform deployed at one or more co-locations, each implemented with one or more servers 303. Network 304 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 306 may be any suitable device capable of connecting to network 304 and downloading or consuming streams of VOD or broadcast content provided by service 302. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches, smart glasses, or virtual reality headsets), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling content service 302. Alternatively, such resources may be independent of content service 302, e.g., on a platform under control of a separate provider of computing resources with which content service 302 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 302 is described as if it were integrated with the platform(s) that provides the content to client devices. However, it will be understood that content service 302 may provide access to content in conjunction with one or more content delivery networks (e.g., CDN 304) that may or may not be independent of content service 302. In addition, the source of the content may or may not be independent of content service 302 (e.g., as represented by content provider server 316).

Implementations enabled by the present disclosure contemplate logic and video decoder(s) resident on the client devices consuming content from content service 302; such logic and video decoder(s) being configured to download and decode frames of stereoscopic 3D video files as described herein and display the resulting images. The logic and/or decoder(s) might be part of an existing algorithm or module on the client device or implemented to work in conjunction with such an algorithm or module. The logic and/or decoder(s) might be implemented, for example, in a media player on the client device, as a browser plug-in, or as a separate application or module resident on the client device.

Implementations are also contemplated in which, in addition to content delivery logic 310 (which facilitates various aspects of content delivery to client devices 306), content service 302 may include logic that facilitates at least some aspects of the encoding of content as described herein (e.g., as represented by content encoding logic 311). Encoding logic 311 might encode reference and non-reference frames according to a particular algorithm, pattern, or order, as described herein. In addition, encoding logic 311 may encode a frame based, at least in part, upon which view the frame is associated with, whether the frame is a reference frame or non-reference frame and/or the type of frame (e.g., I, P, B). In one implementation, encoding is performed such that the distribution of I-frames, P-frames, and B-frames is optimized to facilitate the decoding of frames. For example, a frame may be encoded as an I-frame rather than a P-frame to eliminate dependences of the frame on other frames, enabling the frame to be decoded without prior downloading or decoding of additional frames. As another example, a frame may be encoded as an I-frame or a P-frame to reduce or eliminate the number of B-frames to be decoded.

The frames associated with stereoscopic content may be encoded according to a particular video encoding standard or multiple encoding standards. More particularly, encoding logic 311 can employ one or more video encoders 314, where each video encoder 314 operates according to a different video encoding standard. In one implementation, video encoder 314 is configured to encode stereoscopic content in base layer(s) and enhancement layer(s) according to an encoding standard such as H.265. As will be appreciated, video encoding can be implemented in software and/or hardware.

In some implementations, content service 302 also includes content packing logic 313. Content packing logic 313 may pack encoded frames in a particular order or pattern to facilitate the downloading and/or decoding of frames associated with a particular fragment or view.

In accordance with various implementations, content packing logic 313 may pack the frames of stereoscopic content such that frames of a left eye view and frames of a complementary right eye view are in separate fragments. For example, a first fragment may contain only frames corresponding to a left eye view, while a second fragment may contain only frames corresponding to a right eye view. Thus, frames of base layer(s) and those of enhancement layer(s) may be packed in distinct fragments. In some implementations, reference frames may be packed in fragments that are distinct from fragments containing non-reference frames. Frames may further be grouped by frame type. (e.g., I-frame, P-frame, B-frame).

In some implementations, reference frames may be distinguished from non-reference frames using frame numbering. For example, reference frames may be numbered using odd numbers, while non-reference frames may be numbered using even numbers (or vice versa). Similarly, frames associated with one eye view may be distinguished from frames of another complementary eye view by using frame numbering and/or time stamps. For example, frames of a first eye view may be numbered using odd numbers, while frames of a second eye view may be numbered using even numbers.

In various implementations, supplementary data may be transmitted within additional messages such as User Data Unregistered Supplementary Echo Intelligence (SEI) messages. Supplementary data may include metadata provided on a fragment or frame level; the supplementary data may be provided for the base layer and/or enhancement layer. Supplementary data may include bitstream information indicating that frames of a particular eye view are encoded within a base layer and frames of a complementary eye view are encoded in a temporal enhancement layer, where the frames of the eye view are temporally correlated with the frames of the complementary eye view. The supplementary data may also indicate that a particular frame has been skipped during the encoding process. In these instances, the supplementary data may indicate that the skipped frame need not be decoded; instead, the complementary eye view frame may be rendered for both eyes.

Since the frames of each eye view and/or associated reference frames may be identified from a fragment index according to a frame numbering scheme, a client device may use the fragment index to selectively download and decode frames for a particular eye view, reference frames for one or more views, and/or non-reference frames for one or more views. In one implementation, content packing logic 313 may pack encoded frames according to an order or numbering scheme that corresponds to the reference hierarchy of the corresponding fragment index. For example, within the reference hierarchy, those frames that are even-numbered may reference odd-numbered frames, but odd-numbered frames may not reference even-numbered frames (or vice versa). By using the reference hierarchy, content packing logic 313 may pack the frames in the order in which the frames will be downloaded and decoded. Therefore, reference frames of a fragment or view may be downloaded and/or decoded prior to non-reference frames of the same fragment or view.

In some implementations, temporal enhancement layer frames are below base layer frames within the reference hierarchy. In one implementation, the temporal layer does not reference B frames in the base layer.

In addition to providing access to content, content service 302 may also include a variety of information related to the content (e.g., manifests or other metadata) in data store 312 to which service 302 provides access. Alternatively, such information about the content, as well as the content itself may be provided and/or hosted by one or more separate platforms, e.g., CDN 304. It should be noted that, while logic 310, 311, and 313, video encoder 314, and data store 312 are shown as integrated with content service 302, implementations are contemplated in which some or all of these operate remotely from the associated content service, and/or are under the control of an independent entity. From these examples, those of skill in the art will understand the diversity of use cases to which the techniques described herein are applicable.

Figure 4:
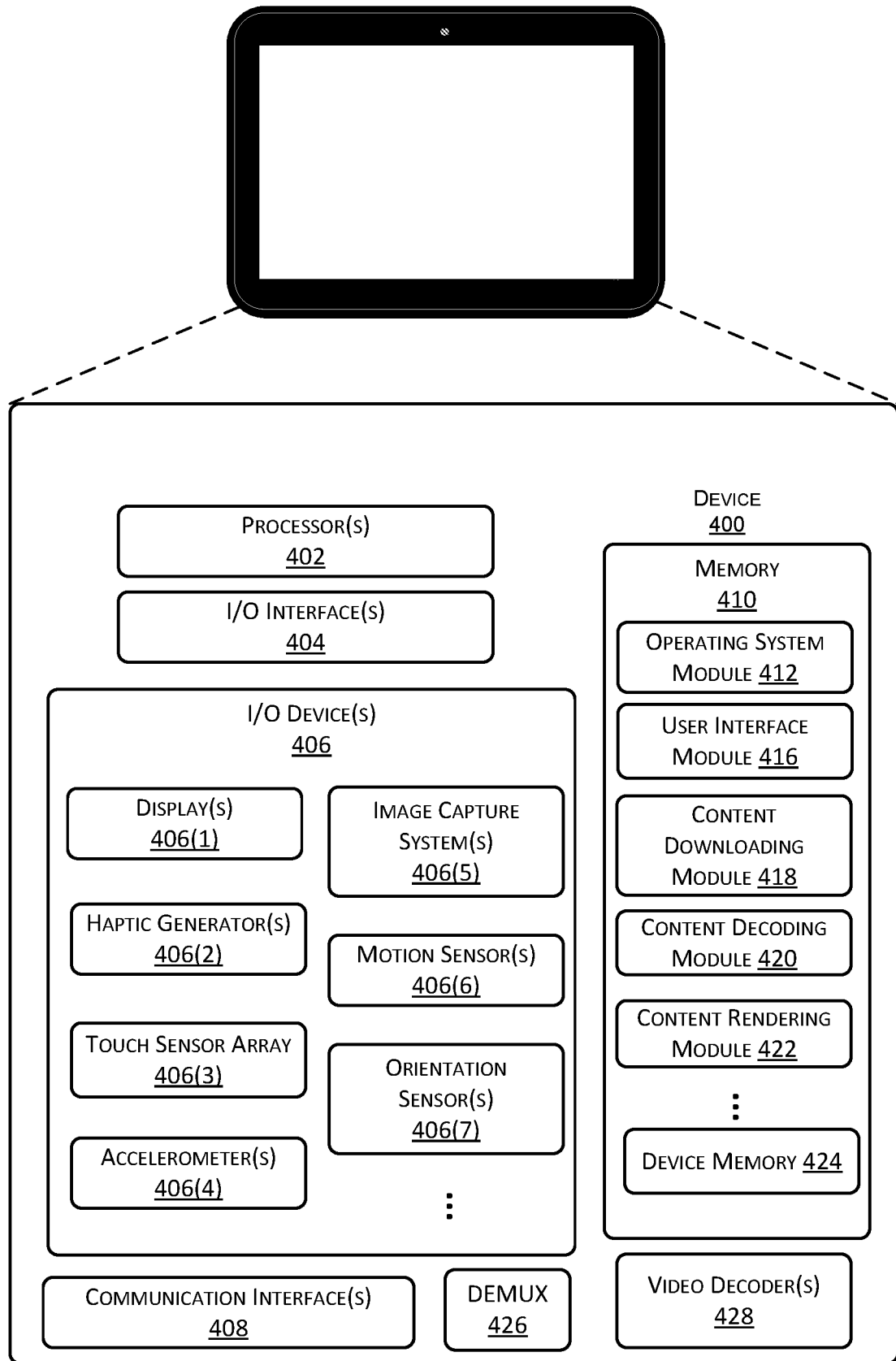
FIG. 4 is a simplified diagram of an example of a client device with which various implementations may be practiced.

A block diagram of an example of a client device 400 suitable for use with various implementations is shown in FIG. 4. Device 400 includes one or more single or multi-core processors 402 configured to execute stored instructions (e.g., in device memory 424). Device 400 may also include one or more input/output (I/O) interface(s) 404 to allow the device to communicate with other devices. I/O interfaces 404 may include, for example, an inter-integrated circuit (I2C) interface, a serial peripheral interface (SPI) bus, a universal serial bus (USB), an RS-242 interface, a media device interface, and so forth. I/O interface(s) 404 is coupled to one or more I/O devices 406. The I/O device(s) 406 may include one or more displays 406(1), one or more haptic generators 406(2), a touch sensor array 406(3), one or more accelerometers 406(4), one or more image capture systems 406(5), one or more motion sensors 406(6), one or more orientation sensors 406(7), microphones, speakers, and so forth. Displays 406(1) may include a stereoscopic display or a monoscopic display.

User interaction with a virtual reality environment may be detected via one or more of the I/O devices 406. For example, a position or perspective of a user in relation to his or her virtual reality environment may be detected via one or more of the I/O devices 406. Based upon the current position or perspective (e.g., angle) of the user within the virtual reality environment, device 400 may identify the portions (e.g., views) of the virtual reality environment that are visible from the current position/perspective, portions of the virtual reality environment that are likely to become visible, and/or the portions of the virtual reality environment that are not visible from the current position/perspective.

Device 400 may also include one or more communication interfaces 408 configured to provide communications between the device and other devices. Such communication interface(s) 408 may be used to connect to cellular networks, personal area networks (PANs), local area networks (LANs), wide area networks (WANs), and so forth. For example, communications interfaces 408 may include radio frequency modules for a 3G or 4G cellular network, a WiFi LAN and a Bluetooth PAN. Device 400 also includes one or more buses or other internal communications hardware or software (not shown) that allow for the transfer of data and instructions between the various modules and components of the device.

Device 400 also includes one or more memories (e.g., memory 410). Memory 410 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 410 provides storage for computer readable instructions, data structures, program modules and other data for the operation of device 400. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 410 includes at least one operating system (OS) module 412 configured to manage hardware resources such as I/O interfaces 404 and provide various services to applications or modules executing on processor(s) 402. Memory 410 also includes a user interface module 416, content downloading module 418, content decoding module 420, content rendering module 422, and other modules.

Content downloading module 418 downloads entire media fragments or specific frames from content service 204, as described herein. In some implementations, content downloading module 418 downloads reference frames corresponding to non-visible views. In a particular implementation, content downloading module 418 downloads frames of base layer(s) of the stereoscopic video content independently from enhancement layer(s) of the stereoscopic video content.

Where the device is used in a virtual reality context, a predictive model may be applied to select the non-visible view(s) for which to download non-reference frames. Content downloading module 418 may download non-reference frames as non-visible views become visible. In one implementation, the non-reference frames may be downloaded from enhancement layer(s) of the virtual reality content.

Content decoding module 420 selects frames to decode and sends the selected frames to a video decoder 248. In a virtual reality context, content decoding module 420 may decode reference frames for non-visible views, as will be described in further detail below. In some implementations, content decoding module 420 applies a predictive model to selectively decode non-reference frames that have been downloaded. Content decoding module 420 may subsequently decode non-reference frames as non-visible views become visible.

Video decoder 428 includes software and/or hardware (e.g., electrical components or a circuit) configured to decode frames of video content files according to a corresponding video encoding standard such as H.265. A demultiplexer (DEMUX) 426 may demultiplex frames of fragments and pass the demultiplexed frames to decoder 428 for decoding.

Content rendering module 422 may render stereoscopic content based on the decoded frames. At any given time, the decoded frames may include those corresponding to a left eye view and/or a right eye view. In some implementations, content rendering module 422 renders stereoscopic virtual reality content based on the decoded frames for the portions of the virtual reality environment that are in view.

A stereoscopic device typically includes a compositor that combines images corresponding to left eye and right eye frames for the same temporal sample. In the event that a frame for a single eye view has been decoded without decoding the frame for the complementary eye view, the image for a single eye view may be rendered to present a monoscopic rather than a stereoscopic view.

Memory 410 also includes device memory 424 to store a wide variety of instructions and information using any of a variety of formats including, for example, flat files, databases, linked lists, trees, or other data structures. Such information includes content for rendering on display 406(1) including, for example, any type of video content (e.g., frames, fragments, or video files). In some implementations, a portion of device memory 424 may be distributed across one or more other devices including servers, network attached storage devices, and so forth.

The logic or computer program instructions used to support the downloading, decoding, and rendering of virtual reality content may be implemented in a variety of ways. For example, at least some of this functionality may be implemented as part of the code of a media player operating on device 400. Alternatively, at least some of this functionality may be implemented separately from and interact with the device's media player, web browser, mobile app, decoder, etc. The range of possibilities will be understood by those of skill in the art with reference to the following description.

It will also be understood that device 400 of FIG. 4 is merely an example of a device with which various implementations enabled by the present disclosure may be practiced, and that a wide variety of other device types including, for example, virtual reality headsets may also be used. The scope of this disclosure should therefore not be limited by reference to device-specific details.

During the encoding process, data may be reduced by removing redundancies intra-view and inter-view. However, data reduction achieved by removing redundancies is typically minimal. To further reduce the amount of data representing the 3D video content, the residual signal can be compressed by a lossy compression technique such as quantization. Lossy compression techniques balance the compression ratio against distortion of the rendered images.

When the frames are subsequently decoded, the quality of the images presented to a viewer is determined, in part, by the amount of signal loss or distortion resulting from the quantization process. Since quantization introduces varying amounts of signal loss for different types of frames, the visual quality of the images rendered and presented to the viewer's different eyes may be inconsistent. This difference in visual quality can be distracting to the viewer. Moreover, while a viewer may tolerate some level of distortion in an image, the distortion may be more easily detected in instances where a frame for only a single view is rendered at a given time. In some implementations, a left eye view and complementary right eye view are encoded using the same or similar quantization parameters.

In accordance with various implementations, an encoder encodes frames of a left eye view and a right eye view within a base layer and temporal enhancement layer, enabling stereoscopic content to be decoded by a device that does not support MVC. In one implementation, encoding is performed such that frames corresponding to a left eye view and frames corresponding to a complementary right eye view are alternately encoded within a base layer and temporal enhancement layer.

As will be described in further detail below, in some implementations, the video encoder may alternately encode left eye and right eye frames within both a base layer and an enhancement layer. More particularly, frames of a first eye view may be encoded in the base layer and frames of a second eye view may be encoded in the enhancement layer. For example, left eye frames may be encoded in the base layer, while right eye frames may be encoded in the enhancement layer (or vice versa).

Figure 5A:
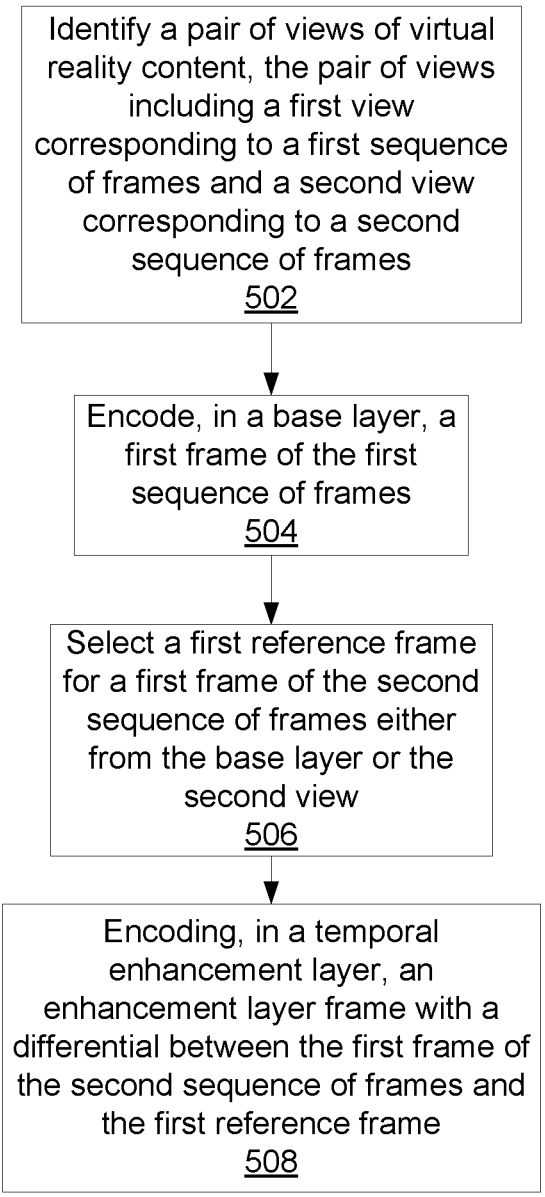
FIG. 5A is a flowchart illustrating a method of encoding stereoscopic content according to various implementations.

FIG. 5A is a flowchart illustrating a method of encoding stereoscopic content according to various implementations. As shown in FIG. 5A, a video encoder identifies a pair of views of stereoscopic content at 502. The pair of views includes a left eye view and a complementary right eye view. In some implementations, each view of multiple views of virtual reality content corresponds to a sequence of frames for a left eye perspective or a right eye perspective from a corresponding position/perspective within a virtual reality environment.

As shown in FIG. 5A, the video encoder may encode a first frame for a first eye view. More particularly, the video encoder may encode, in a first base layer frame of a base layer, a first frame of a first sequence of frames corresponding to the first eye view at 504. For example, the video encoder may encode the first frame for the left eye view in the base layer. As described herein, an encoded frame may be a reference or non-reference frame. In some implementations, the first eye view is encoded in the base layer prior to encoding the second eye view in the enhancement layer.

Rather than encode the first frame for a second eye view (e.g., right eye view), the video encoder may encode a corresponding differential from one or more reference frames. While the video encoder may encode a differential between the first frame of the second eye view and multiple reference frames, the encoding of a differential between the first frame of the second eye view and a single reference frame is described below to simplify the description.

As shown at 506, the video encoder may select a first reference frame for a first frame of a second sequence of frames corresponding to the second eye view at 506. For example, the video encoder may select a reference frame for the first frame corresponding to the right eye view.

At the time of encoding, the video encoder may select an optimal reference frame to use for a given left eye or right eye view frame. More particularly, a reference frame may be selected for a second eye view frame from 1) a base layer frame corresponding to the complementary view for the same time instant or 2) frames for the same view (e.g., where each frame corresponds to a previous or subsequent time instant). Therefore, an enhancement layer frame may represent the delta between the image to be presented and one or more reference frames, where a reference frame corresponds to the same instant of time or a different (e.g., prior or subsequent) instant of time.

In some implementations, the video encoder may compare the left eye view frame with the right eye view frame corresponding to the same time instant (e.g., timestamp). In some instances, the left eye view frame and the right eye view frame may be the same or may be substantially identical. This is likely, for example, where the user is a significant distance from the images being viewed. If the left eye and right eye view frames are substantially identical, the encoder need not encode the second view frame. In one implementation, for a distance view where the delta between a left eye view frame and a right eye view frame falls below a threshold, the enhancement layer frame may be encoded with a frame repeat tag that signifies that the enhancement layer frame may be skipped by a decoder; instead, the complementary frame within the base layer may be rendered for both eyes. In other implementations, metadata indicating that a particular enhancement layer frame has been skipped during the encoding process may be provided within the base layer frame or a supplementary message.

Where the left and right eye view frames having the same timestamp are not substantially identical, the base layer frame having the same timestamp may be selected as the reference frame; this enables the difference between the left eye view frame and right eye view frame having the same timestamp to be encoded in the enhancement layer. However, if the difference between the left eye view frame and the right eye view frame having the same timestamp is significant (e.g., greater than a particular threshold), the video encoder may elect to reference a previous or subsequent frame of the same view to encode the enhancement layer frame.

In accordance with various implementations, a reference frame may be selected by comparing an eye view frame to previous and/or subsequent frame(s) for the same view. The encoder may select the reference frame that is most similar to the eye view frame being encoded.

Video encoders can encode different types of frames at different quality levels. For example, B frames may be encoded at a lower quality level than I frames or P frames. In some implementations, the quality of the images is optimized by avoiding references that reduce the quality of the enhancement layer frames. More particularly, encoding may be biased toward encoding P frames instead of B reference frames. For example, a reference frame may be selected by comparing the eye view frame with only previous frames within the same view. By reducing or limiting the number of B frames that are encoded, the quality of the images and the latency with which the images are rendered may be improved.

Once the reference frame(s) has been selected for encoding of a particular left eye frame or right eye frame, the encoder may encode, in an enhancement layer frame, a delta representing the difference between the current frame and the selected reference frame. As shown at 508, the video encoder may encode, in an enhancement layer, a first enhancement layer frame with a differential between the first frame of the second sequence of frames and the first reference frame.

Frames for subsequent time instants may be encoded in a similar fashion by alternating the eye views that are encoded within the base layer and temporal enhancement layer. In this manner, left eye and complementary right eye views may be encoded within the base and temporal enhancement layer.

Supplementary messages such as SEI messages may also be encoded within the base layer and/or the temporal enhancement layer. For example, a supplementary message may indicate that the frames of the first eye view are encoded in the base layer and the frames of the second eye view are encoded in the enhancement layer. In one implementation, a supplementary message indicates that a particular base layer frame corresponds to the first view and the complementary temporal enhancement layer frame having the same timestamp corresponds to the second view. As another example, a supplementary message may indicate that a particular frame has not been encoded within the base layer or enhancement layer.

In some implementations, stereoscopic content is encoded according to a maximum number of concurrent reference frames that can be referenced by a P or B frame. The maximum number of concurrent reference frames may be split between the base layer and temporal enhancement layer. For example, where the maximum number of concurrent reference frames is 4, a maximum of 3 reference frames may be allowed for the base layer and a maximum of 1 reference frame may be allowed for the temporal enhancement layer.

The stereoscopic content may also be encoded according to a maximum number of consecutive B frames. In a particular embodiment, the maximum number of consecutive B frames may be split for the base layer and temporal enhancement layer. For example, where the maximum number of consecutive B frames is 16, a maximum of 13 consecutive B frames may be allowed for the base layer and a maximum of 3 consecutive B frames may be allowed for the enhancement layer.

Figure 5B:
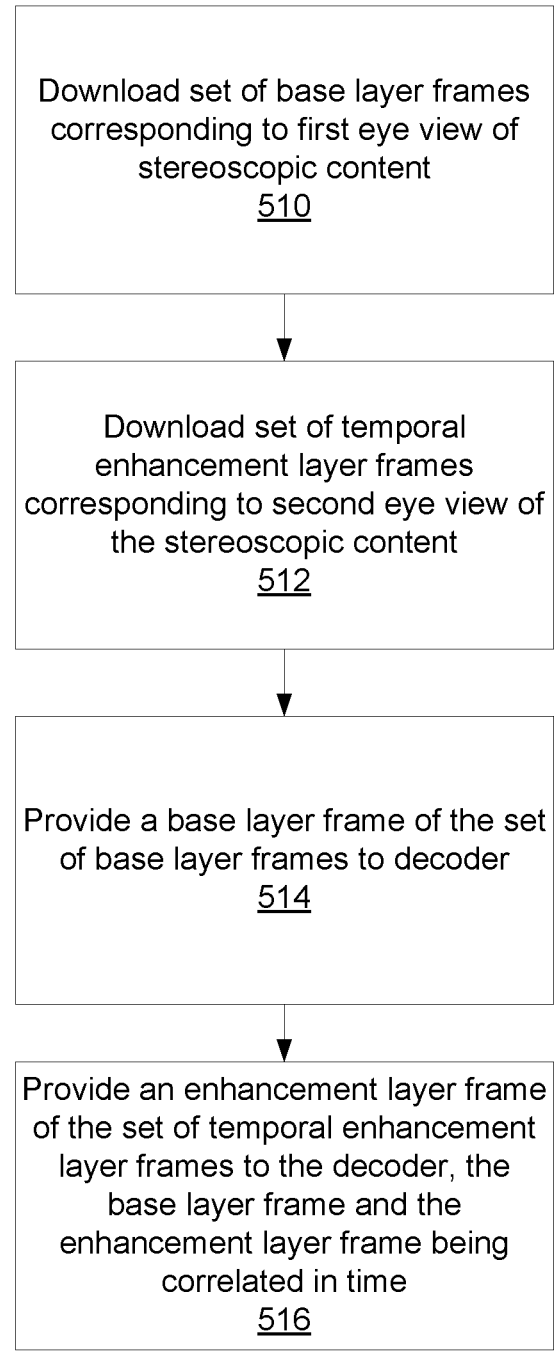
FIG. 5B is a flowchart illustrating a method of decoding stereoscopic content according to various implementations.

FIG. 5B is a flowchart illustrating a method of decoding stereoscopic content according to various implementations. A client device may ascertain, from metadata provided within an encoded bitstream, that stereoscopic video content is encoded within a base layer and temporal enhancement layer.

As shown in FIG. 5B, a set of base layer frames corresponding to a first eye view of stereoscopic content is downloaded, where the first eye view corresponds to a first sequence of frames (510). In addition, a set of temporal enhancement layer frames corresponding to a second eye view of the stereoscopic content may be downloaded, where the second eye view corresponds to a second sequence of frames (512). The first sequence of frames and the second sequence of frames are correlated in time. Example methods of downloading base layer frames and enhancement layer frames will be described in further detail below with reference to FIGS. 6A and 6B.

A first base layer frame of the set of base layer frames is provided to the decoder (514). A first enhancement layer frame of the set of temporal enhancement layer frames is also provided to the decoder, where the first base layer frame and the first enhancement layer frame are correlated in time.

It is possible that a second frame within the first sequence of frames corresponding to the first eye view has been encoded, but a second frame within the second sequence of frames corresponding to the second eye view has not been encoded in the enhancement layer. Metadata indicating that the second eye view frame has been skipped during the encoding process may be provided on the frame or fragment level. Moreover, the metadata may be provided within the complementary base layer frame (e.g., the base layer frame corresponding to the same temporal sample as the skipped frame), the enhancement layer frame, or a separate supplementary message. In some implementations, a frame repeat flag may be set within a base layer frame, an enhancement layer frame, or a supplementary message. Where encoding of an enhancement layer frame has been skipped, the complementary base layer frame for the first eye view may be rendered for both the user's left and right eyes.

FIG. 6A is a flowchart illustrating a method of downloading stereoscopic content according to various implementations. A user may connect with a system offering a service such as a content service (or associated web site) via the Internet using a client device and browse a catalogue of stereoscopic content items offered by the service.

Access to content over the Internet is typically governed by a digital rights management system such as Google's Widevine, Microsoft's PlayReady, Apple's FairPlay, or Sony's OpenMG to name a few representative examples. Content may be encrypted using any of a variety of encryption technologies including, for example, various Advanced Encryption Standard (AES) and Elliptic Curve Cryptography (ECC) encryption techniques. It should be noted that the techniques described herein are compatible with a wide range of content services, media players, DRM systems, encryption technologies, and streaming technologies, the details of which are known to those of skill in the art. The nature and operation of these technologies will therefore not be described in detail to promote clarity.

Referring now to FIG. 6A, the user may connect to the system by completing a login process using the client device and, after selecting stereoscopic content from the catalogue of content, the client device sends a request to the system for the selected stereoscopic content (602).

The system provides the client device with a manifest that the client device can use to acquire selected fragments or frames of the fragments (also referred to as a group of pictures or GOP) of the video content file(s) that include the stereoscopic content (604). The manifest file includes information relating to the requested content that allows a client device to generate properly formatted requests for specific frames or fragments of the content. For a particular time segment, the manifest file may identify a number of different options to request for playback of that segment. The fragments for a given content segment may be of different sizes, for different streaming protocols, for different display resolutions, for different bit rates, etc.

Each fragment (also referred to as a group of pictures or GOP) starts with an index that identifies the frames of the fragment, the reference hierarchy (i.e., representing the dependencies between or among frames), and the offset of each frame in the file. The index may be provided in a header of a fragment. For example, this index is in the Movie Fragment ("moof") box of a media container file based on the ISO Base Media File Format, e.g., a the Common File Format (CFF) file, a Common Media Format (CMF) file, or an MP4 format file. As will be appreciated, these are merely examples of file types that may be used with implementations enabled by the present disclosure.

The client device can initiate acquiring the stereoscopic content of the video content file(s) using the manifest received from the system (606). More particularly, the client device can download entire media fragments. Alternatively, the client device can download the indices (e.g., headers) of the media fragment(s) of the video content files so that frames may be selectively downloaded.

The manifest and/or the fragment index may be used to access frames for a particular view. More particularly, the manifest or fragment index may indicate the location (e.g., offset) of frames for a particular view, reference frames, non-reference frames, and/or frames of a particular frame type. In one implementation, for each fragment, the manifest identifies specific view(s), as well as byte ranges for groups of frames (e.g., reference frames, non-reference frames, or frames of a particular frame type).

In some implementations, the client device may download frames of base layer(s) without downloading frames of the temporal enhancement layer. For example, the client device may download a first fragment containing frames of a base layer without downloading a second fragment containing frames of a temporal enhancement layer, where the frames of the base layer and the frames of the temporal enhancement layer are correlated in time. This may be desirable, for example, for client devices that do not support the encoding standard via which the enhancement layer is encoded or client devices having a monoscopic display. Moreover, in some situations, the client device may choose not to download enhancement layer frames to conserve battery life of the client device. For example, the client device may not download enhancement layer frames while the device is in a low power mode.

In some implementations, enhancement layer frames for a particular view may be packed in the same fragment as corresponding base layer frames. For example, frames that are odd-numbered may correspond to base layer frames, while frames that are even-numbered may correspond to enhancement layer frames (or vice versa). Base layer frames may be selectively downloaded by downloading odd-numbered frames without downloading even-numbered frames.

In other implementations, enhancement layer frames may be packed in separate fragments from the base layer frames. For example, fragments that are odd-numbered may correspond to base layer frames, while fragments that are even-numbered may correspond to enhancement layer frames (or vice versa). Base layer frames may be downloaded by downloading fragments containing only base layer frames without downloading fragments containing only enhancement layer frames.

Frames may be packed such that frames for the left eye can be quickly distinguished from frames for the right eye. In some implementations, left eye frames may be packed in the same fragment as corresponding right eye frames. More particularly, base layer frames and enhancement layer frames may be packed in the same fragment. For example, frames that are odd-numbered may correspond to left eye frames, while frames that are even-numbered may correspond to right eye frames (or vice versa). In other implementations, frames for the left eye may be packed in fragments that are separate from those for the right eye (e.g., by packing base layer frames in one fragment and packing complementary enhancement layer frames in a separate fragment). The contents of a given fragment may be indicated by a fragment number. For example, fragments that are odd-numbered may correspond to left eye frames, while fragments that are even-numbered may correspond to right eye frames (or vice versa).

In accordance with various implementations, each fragment index includes a reference hierarchy that indicates dependencies among the frames within the fragment. More particularly, the reference hierarchy may indicate those frames that are reference frames (e.g., I-frames, reference P frames, reference B frames), as well as those frames that are non-reference frames (e.g. non-reference P frames, non-reference B frames). For example, reference frames may be identified as odd-numbered frames, while non-reference frames may be identified as even-numbered frames, or vice versa.

The client device may parse the reference hierarchy for a fragment to determine the dependencies between and among the frames of the fragment. Dependency information that indicates the dependencies among frames of one or more fragments (or portion thereof) may be maintained in the form of a tree or other suitable data structure.

Stereoscopic content may include virtual reality content. For example, the virtual reality content may be a 3D virtual reality game that enables the user to fly a plane and shoot at alien space ships. Each of the possible views of a virtual reality environment may correspond to either a left eye perspective or right eye perspective. As the user's position/perspective within the virtual environment changes, the pertinent views may be identified, as will be described in further detail below with reference to FIG. 6B.

As shown in FIG. 6B, input indicating a position or perspective (e.g., viewing angle) of a user in relation to their virtual environment may be detected or received via I/O device(s) of the client device (608). For example, the input may be received or detected via sensors such as touch sensor array(s), accelerometer(s), image capture system(s), a motion sensor(s), orientation sensor(s), and/or a microphone. As another example, the input may be obtained from an external I/O device such as a wired glove. Upon detecting the current position or perspective, the client device can identify views that are most pertinent to the user's current position/perspective.

In one implementation, the virtual reality content includes a plurality of possible views. More particularly, the views of the virtual reality environment may include a view for each possible position or perspective within the virtual reality environment. Each of the views may correspond to a left eye perspective or a right eye perspective. As described above, each of the views of the virtual reality environment corresponds to a sequence of frames. A sequence of frames may include reference frames and/or non-reference frames. The sequences of frames for the left and complementary right eye views are synchronized in time.

The client device may identify or select a subset of the views (610), where each view in the subset is not visible from a current position or perspective of the user in relation to the virtual reality environment. For example, the subset of the views may include the views that are not currently visible from the current position within the virtual reality environment. As another example, the subset of the views may include those that have a high probability of being rendered (e.g., selected by the user) within a particular period of time. The subset of the views may be selected based, at least in part, on input received or detected via I/O device(s) integral with or coupled to the client device, network conditions, and/or the time that it takes to download content to the client device.

To determine those portions of the virtual reality environment that have a high probability of being viewed within a particular period of time, the client device may predict the user's future movements within the virtual environment. More particularly, the client device may determine those view(s) that have the highest probability of being accessed next by the user (e.g., by changing his or her location or perspective within the virtual reality environment) and/or the order in which the views will be accessed. For example, a predictive model may ascertain the possible paths (e.g., states) that the user may traverse within the virtual reality environment, and identify the views within those paths that have a high probability of being viewed next by the user (e.g., via interaction with the client device). The possible paths may be represented by a tree or other suitable data structure. Information that is used to predict the user's future movements within the virtual environment may include, but is not limited to, the direction that the user is facing or moving within the virtual environment, a speed with which the user is moving, sounds (e.g., noises or disturbances) within the virtual environment, sounds that the device may anticipate within the virtual environment, and/or the location or direction from which sounds are or may be transmitted within the virtual environment. In this manner, the client device may use a predictive model to select the reference frames to download, as well as determine the appropriate timing with which to download the reference frames.

In one implementation, for each non-visible view in the subset of views, the reference frames in the corresponding sequence of frames are downloaded (e.g., while the view is not visible) without downloading the corresponding non-reference frames (612). For a given view, the client device can download frames corresponding to the view using the fragment index. The client device can request a portion of a fragment by requesting a particular byte range within the fragment. In one implementation, the client device downloads reference frames of base layer(s) for each non-visible view in the subset of views. The client device may store the frames in a frame buffer as they are acquired.

In accordance with various implementations, frames are packed for the fragment or view such that reference frames are grouped together in a sequence of frames and the non-reference frames are grouped together in a separate sequence of frames, enabling reference frames for a given view to be downloaded efficiently. Frames may also be grouped according to frame type.

According to one class of implementations, the fragments may be packed at the server side and downloaded in tier order, i.e., grouping frames in chunks of the same frame type, e.g., all of the I-frames, all of the reference P-frames, all of the reference B-frames, etc. For example, frames may be grouped in chunks according to a particular pattern (e.g., I-frames, followed by reference P-frames, etc.). This would allow for the client to request only certain types of frames, e.g., to request only I-frames and reference P-frames.

In implementations in which the frames of a fragment are packed at the server side according to tier order or frame type, the partial fragment request might specify one or more byte ranges that correspond to one or more types of frames. That is, because the frames are arranged in a fragment according to frame type, the client device can use the fragment index to identify the byte range corresponding to frames of a particular type. The request could then be generated to request the byte range(s) associated with specific frame types. For example, the client may request only the I-frames and some of the reference P-frames.

The client device may track which frames have been downloaded. More particularly, the client device may track the frames that are downloaded for each view. For example, the client device may track whether reference frames have been downloaded for a given view and/or the type of reference frames that have been downloaded for a given view.

When it is likely that a view in the subset of the views will become visible to the user, non-reference frames in the sequence of frames associated with the view may be downloaded. By selectively downloading reference frames for portions of the virtual reality environment not currently in view, the amount of data that is streamed over the Internet and downloaded to a client device to generate 3D virtual reality video may be significantly reduced.

In accordance with various implementations, the client device may download frames such that the duration of the frame buffer is maintained at a minimum threshold level to ensure that frames can be continuously decoded and rendered by the client device without interruption. For example, the client device may maintain a count of the number of frames or bytes in the frame buffer. In addition, the buffer duration of the currently downloading frames may be added to the buffer duration. The determination of buffer duration may also account for data being processed in the demultiplexing and/or decoding pipelines that has not yet been displayed.

Figure 7:
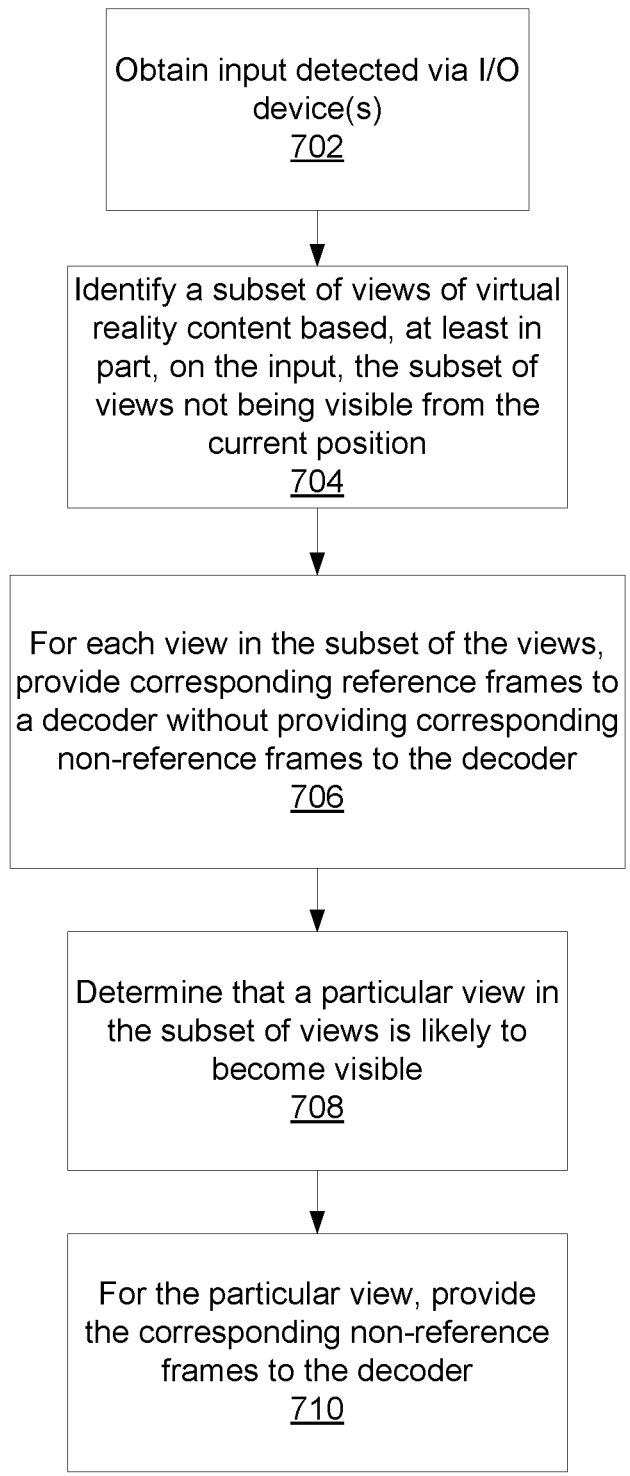
FIG. 7 is a flowchart illustrating a method of decoding stereoscopic virtual reality content according to various implementations.

FIG. 7 is a flowchart illustrating a method of decoding stereoscopic virtual reality content according to various implementations. The client device may obtain input that has been received or detected via one or more I/O device(s), where the input indicates a current position/perspective within the virtual reality environment (702). The I/O device(s) may be integral to the client device or external to the client device.

A number of different views of the virtual reality content may be presented to a viewer of the client device based upon the changing position/perspective within the virtual reality environment. The various views of the virtual reality content each corresponds to either a left eye perspective or a right eye perspective, enabling the virtual reality environment to be rendered using stereoscopic technology. As described above, each of the views has a corresponding sequence of frames including reference frames and/or non-reference frames of the virtual reality content.

The client device identifies a subset of the views of the virtual reality content based, at least in part, on the input (704), where each view in the subset of the views is nonvisible from the current position/perspective. Non-visible views may include those that can only become visible from other positions or perspectives within the virtual reality environment. Nonvisible views may include a left eye view and/or a complementary right eye view corresponding to the same temporal sample.

In accordance with various implementations, a predictive model is applied to select the subset of the views (e.g., views that are not visible from the current position/perspective within the virtual reality environment). For example, the predictive model may predict probable next position(s)/perspective(s) of the viewer. A particular number of non-visible views may be selected based, at least in part, on the probability that the corresponding views will be accessed next by the user (e.g., within a particular period of time). A decode order may be assigned to the views or associated frames (e.g., reference frames) based, at least in part, on the probability that the views will be selected by the user within a particular period of time and/or the order in which the user is likely to access the various views of the virtual reality environment. Reference frames for those portions of the virtual reality environment not currently in view may be decoded according to the decode order. In this manner, a predictive model may be applied to select reference frames to decode, as well as determine the timing with which the reference frames are to be decoded. The information used by a predictive model to select views for decoding of reference frames may be different from the information used to select views for downloading of reference frames.

For each non-visible view in the subset of the views, the client device may decode reference frames in the corresponding sequence of frames without decoding corresponding non-reference frames for the view (706). More particularly, the reference frames for a view that is not visible from the current position may be provided, while the view is not visible, to a decoder of the client device without providing the non-reference frames for the view to the decoder.

In some implementations, the reference frames are identified based, at least in part, on a frame numbering scheme. For example, the reference frames may be identified as odd-numbered frames or even-numbered frames.

The reference frames may be provided to the decoder with a frequency that may be determined based upon factors such as decoder delay and/or the frequency with which the user's position within the virtual environment changes. In this manner, decoding resources may be optimized while ensuring an uninterrupted viewing experience.

The reference frames that are provided to the decoder may include I-frames, reference P-frames, and/or reference B-frames. In some implementations, all of the reference frames for a non-visible view are provided to the decoder.

The client device may decode reference frames in tier order e.g., I-frames, followed by reference P-frames. By decoding frames in tier order, playback may be achieved with an acceptable level of visual artifacts.

The client device may track which frames have been decoded. More particularly, the client device may track the frames that are decoded for each view. For example, the client device may track whether reference frames have been decoded for a given view and/or the type of reference frames that have been decoded for a given view.

Since some non-visible views will not subsequently become visible, the corresponding non-reference frames need not be decoded. As a result, the number of frames that are decoded is significantly lower than traditional decoding schemes. Therefore, decoding resources can be conserved while providing a continuous virtual reality experience.

As shown at 708, it may be determined that a particular view in the subset of views is likely to become visible. For the particular view, the corresponding non-reference frames may be provided to the decoder at 710. More particularly, when a non-visible view in the subset of the views is likely to become visible or later becomes visible to the user from a subsequent position/perspective within the virtual reality environment, corresponding non-reference frames may be decoded (e.g., provided to the decoder for decoding) without decoding the previously decoded reference frames. Non-reference frames may continue to be decoded from that point in time forward. Alternatively, where a view is likely to become visible or becomes visible and corresponding reference frames have not previously been decoded, both reference and non-reference frames associated with the view may be decoded. In this manner, both reference frames and non-reference frames for the views that are visible to the user may be decoded.

As a viewer changes his or her position or perspective within the virtual reality environment, the decoder may selectively decode non-reference frames for right and left eye views. In some instances, a left eye view may become visible prior to the complementary right eye view (or vice versa). For example, as the viewer rotates left, a left eye view may become visible to the viewer prior to a right eye view corresponding to the same temporal sample. When the viewer moves his or her head abruptly to look at an unexpected region of the virtual reality environment, the decoder may temporarily provide a monoscopic experience for a viewer using a stereoscopic display. In some embodiments, the decoder may elect not to decode at least a portion of the non-reference frames for a second (e.g., right) eye view.

Where the display via which the virtual reality content is rendered is a monoscopic display, frames associated with a second eye view need not be decoded. For example, frames that are even-numbered (or odd-numbered) or frames of fragment(s) that contain only frames for the second eye view may not be decoded.

In some implementations, the client device may conserve battery life by decoding base layer frames without decoding enhancement layer frames. This may be desirable, for example, where the viewer has selected a lower power mode of the device or in situations where it is otherwise desirable to conserve battery life.

By selectively decoding reference frames that are most pertinent to the position and perspective of the user within the virtual reality environment, the amount of data that is decoded for stereoscopic 3D virtual reality video may be minimized. In this manner, the performance of a video decoder may be optimized.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
   receiving, with a computing device, input that has been received or detected via one or more input/output (I/O) devices;
   determining, with the computing device, a current position within a virtual reality environment based, at least in part, on the input;
   identifying, with the computing device, a subset of a plurality of views of virtual reality content, the subset of the plurality of views not being visible from the current position, each of the plurality of views corresponding to a sequence of frames including both reference frames and non-reference frames of the virtual reality content, each of the plurality of views corresponding to a corresponding single eye perspective within the virtual reality environment, each of the plurality of views corresponding to a left eye perspective or a right eye perspective within the virtual reality environment;
   for each of the subset of the plurality of views, decoding, with the computing device, the corresponding reference frames;
   after decoding the corresponding reference frames for each of the subset of the plurality of views, determining, with the computing device, that a particular view in the subset of the plurality of views is likely to become visible;
   for the particular view, decoding, with the computing device, the corresponding non-reference frames, the particular view corresponding to a first eye perspective within the virtual reality environment;
   processing metadata associated with the virtual reality content; and
   rendering an image for both the left and right eye perspectives according to whether the metadata indicates that a frame corresponding to a second eye perspective within the virtual reality environment has been skipped during encoding, the image corresponding to a frame for the first eye perspective.

2. The method as recited in claim 1, further comprising:
   determining, with the computing device, that a second particular view in the subset of the plurality of views is visible or likely to become visible, the second particular view corresponding to the second eye perspective within the virtual reality environment; and
   after determining that the second particular view in the subset of the plurality of views is visible or likely to become visible, decoding for the second particular view, with the computing device, the corresponding non-reference frames.

3. The method as recited in claim 1, further comprising: for each view of the subset of the plurality of views, downloading, with the computing device, the corresponding reference frames of the virtual reality content while the subset of the plurality of views is not visible.

4. The method as recited in claim 1, further comprising: identifying, with the computing device, for each view of the subset of the plurality of views, the reference frames using a reference hierarchy of a fragment of the virtual reality content, the fragment of the virtual reality content corresponding to a time segment of the virtual reality content.

5. The method as recited in claim 1, further comprising: downloading, with the computing device, a first fragment of the virtual reality content, the first fragment of the virtual reality content containing frames of a base layer corresponding to a first eye view of a pair of views, the pair of views including a left eye view and a right eye view; and
downloading, with the computing device, a second fragment of the virtual reality content, the second fragment of the virtual reality content containing frames of an enhancement layer corresponding to a second eye view of the pair of views, where the frames of the base layer and the frames of the enhancement layer are correlated in time, the first fragment of the virtual reality content and the second fragment of the virtual reality content corresponding to the same time segment of the virtual reality content.

6. The method as recited in claim 1, wherein identifying the subset of the plurality of views of virtual reality content comprises selecting the subset of the plurality of views based, at least in part, on probabilities associated with two or more of the plurality of views, each of the probabilities indicating a likelihood that a corresponding one of the plurality of views will become visible.

7. The method as recited in claim 1, wherein identifying the subset of the plurality of views of virtual reality content comprises:
assigning, with the computing device, priorities to two or more of the plurality of views such that each of the two or more of the plurality of views is assigned a corresponding one of the priorities based, at least in part, on probabilities associated with the two or more views, each of the probabilities indicating a likelihood that a corresponding one of the plurality of views will become visible within a particular period of time; and
selecting, with the computing device, the subset of the views based, at least in part, on the priorities.

8. The method as recited in claim 1, further comprising: determining that the metadata associated with the virtual reality content indicates that a frame corresponding to the second eye perspective has been skipped during encoding;
wherein rendering an image for both the left and right eye perspectives according to whether the metadata indicates that a frame corresponding to the second eye perspective within the virtual reality environment has been skipped during encoding includes rendering the image for both the left and right eye perspectives.

9. The method as recited in claim 8, the frame corresponding to the second eye perspective being one of the sequence of frames corresponding to a second particular view of the plurality of views, the method further comprising:
determining that the second particular view is visible or likely to become visible.

10. The method as recited in claim 8, further comprising: skipping decoding of the frame corresponding to the second eye perspective.

11. The method as recited in claim 8, wherein frames corresponding to the first eye perspective within the virtual reality environment are encoded in a base layer and frames corresponding to the second eye perspective within the virtual reality environment are encoded in an enhancement layer, the method further comprising:
wherein determining that the metadata associated with the virtual reality content indicates that a frame corresponding to the second eye perspective has been skipped during encoding includes determining that the metadata indicates that a frame in the enhancement layer has been skipped during encoding.

12. A device, comprising:
a decoder configured to decode video frames encoded according to a particular encoding standard; and
one or more processors and memory configured to:
receive input that has been received or detected via one or more input/output (I/O) devices;
determine a current position within a virtual reality environment based, at least in part, on the input;
identify a subset of a plurality of views of virtual reality content, the subset of the plurality of views not being visible from the current position, each of the plurality of views corresponding to a sequence of frames including both reference frames and non-reference frames of the virtual reality content, each of the plurality of views corresponding to a corresponding single eye perspective within the virtual reality environment, each of the plurality of views corresponding to a left eye perspective or a right eye perspective within the virtual reality environment;
for each of the subset of the plurality of views, provide the corresponding reference frames to the decoder;
after providing the corresponding reference frames for each of the subset of the plurality of views to the decoder, determine that a particular view in the subset of the plurality of views is likely to become visible;
for the particular view, provide only the corresponding non-reference frames to the decoder, the particular view corresponding to a first eye perspective within the virtual reality environment;
process metadata associated with the virtual reality content; and
render an image for both the left and right eye perspectives according to whether the metadata indicates that a frame corresponding to a second eye perspective within the virtual reality environment has been skipped during encoding, the image corresponding to a frame for the first eye perspective.

13. The device as recited in claim 12, the processors and memory being further configured to:
for each view of the subset of the plurality of views, download the corresponding reference frames of the virtual reality content while the subset of the plurality of views is not visible without downloading the corresponding non-reference frames.

14. The device as recited in claim 12, the processors and memory being further configured to:

identify, for each view of the subset of the plurality of views, the reference frames using a reference hierarchy of a fragment of the virtual reality content.

15. The device as recited in claim 12, the processors and memory being further configured to:
   determine that a second particular view in the subset of the plurality of views is visible or likely to become visible, the second particular view corresponding to the second eye perspective within the virtual reality environment; and
   after determining that the second particular view in the subset of the plurality of views is visible or likely to become visible, decode, for the second particular view, the corresponding non-reference frames.

16. A computer program product, comprising one or more non-transitory computer readable media having computer program instructions stored therein, the computer program instructions being configured such that, when executed by one or more processors, the computer program instructions cause the one or more processors to:
   receive input that has been received or detected via one or more input/output (I/O) devices;
   determine a current position within a virtual reality environment based, at least in part, on the input;
   identify a subset of a plurality of views of virtual reality content, the subset of the plurality of views not being visible from the current position, each of the plurality of views corresponding to a sequence of frames including both reference frames and non-reference frames of the virtual reality content, each of the plurality of views corresponding to a corresponding single eye perspective within the virtual reality environment, each of the plurality of views corresponding to a left eye perspective or a right eye perspective within the virtual reality environment;
   for each of the subset of the plurality of views, provide the corresponding reference frames to a decoder;
   after providing the corresponding reference frames for each of the subset of the plurality of views to the decoder, determine that a particular view in the subset of the plurality of views is likely to become visible;
   for the particular view, provide the corresponding non-reference frames to the decoder, the particular view corresponding to a first eye perspective within the virtual reality environment;
   process metadata associated with the virtual reality content; and
   render an image for both the left and right eye perspectives according to whether the metadata indicates that a frame corresponding to a second eye perspective within the virtual reality environment has been skipped during encoding, the image corresponding to a frame for the first eye perspective.

17. The computer program product as recited in claim 16, wherein the computer program instructions are further configured to cause the one or more processors to:
   for each view of the subset of the plurality of views, download only the corresponding reference frames of the virtual reality content while the subset of the plurality of views is not visible.

18. The computer program product as recited in claim 16, wherein the computer program instructions are further configured to cause the one or more processors to:
   download a single fragment of the virtual reality content, the single fragment of the virtual reality content containing frames of a base layer corresponding to a first eye view of a pair of views and frames of an enhancement layer corresponding to a second eye view of the pair of views, the pair of views including a left eye view and a right eye view, the frames of the base layer and the frames of the enhancement layer being correlated in time, the single fragment of the virtual reality content corresponding to a time segment of the virtual reality content.

19. The computer program product as recited in claim 18, wherein the computer program instructions are further configured to cause the one or more processors to:
   identify odd-numbered frames within the fragment as the frames of the base layer; and
   identify even-numbered frames within the fragment as the frames of the enhancement layer.

20. The computer program product as recited in claim 16, wherein the computer program instructions are further configured to cause the one or more processors to:
   identify, for each view of the subset of the plurality of views, the reference frames using a reference hierarchy of a fragment of the virtual reality content.

21. The computer program product as recited in claim 16, wherein the computer program instructions are further configured to cause the one or more processors to:
   determine that a second particular view in the subset of the plurality of views is visible or likely to become visible, the second particular view corresponding to the second eye perspective within the virtual reality environment; and
   after determining that the second particular view in the subset of the plurality of views is visible or likely to become visible, decode, for the second particular view, the corresponding non-reference frames.

* * * * *